Sept. 21, 1948.  W. H. BASELT  2,449,636
BRAKE CYLINDER MOUNTING
Filed July 2, 1945  4 Sheets-Sheet 1
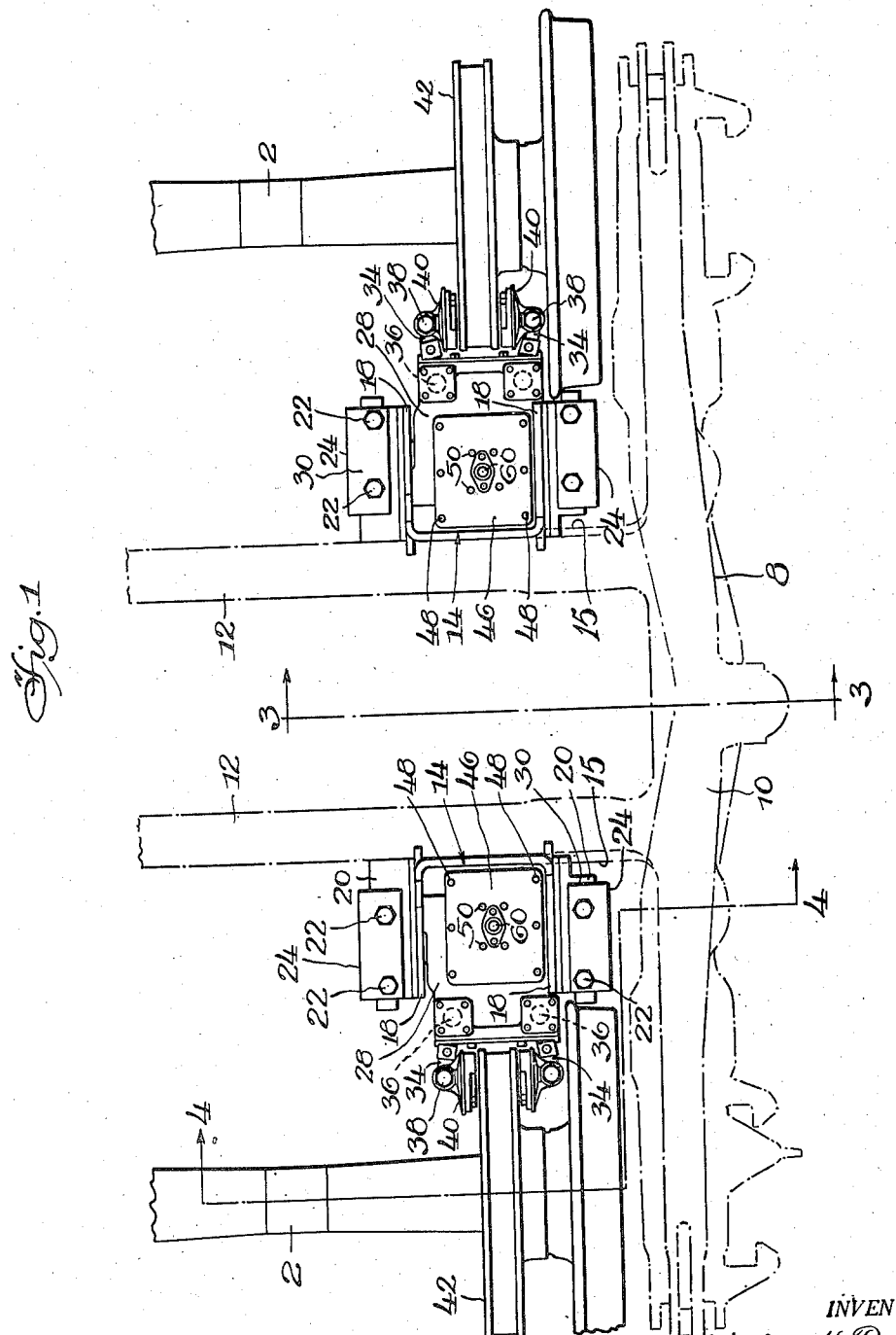
INVENTOR.
Walter H. Baselt
BY
Atty.

Sept. 21, 1948.   W. H. BASELT   2,449,636
BRAKE CYLINDER MOUNTING
Filed July 2, 1945   4 Sheets-Sheet 2
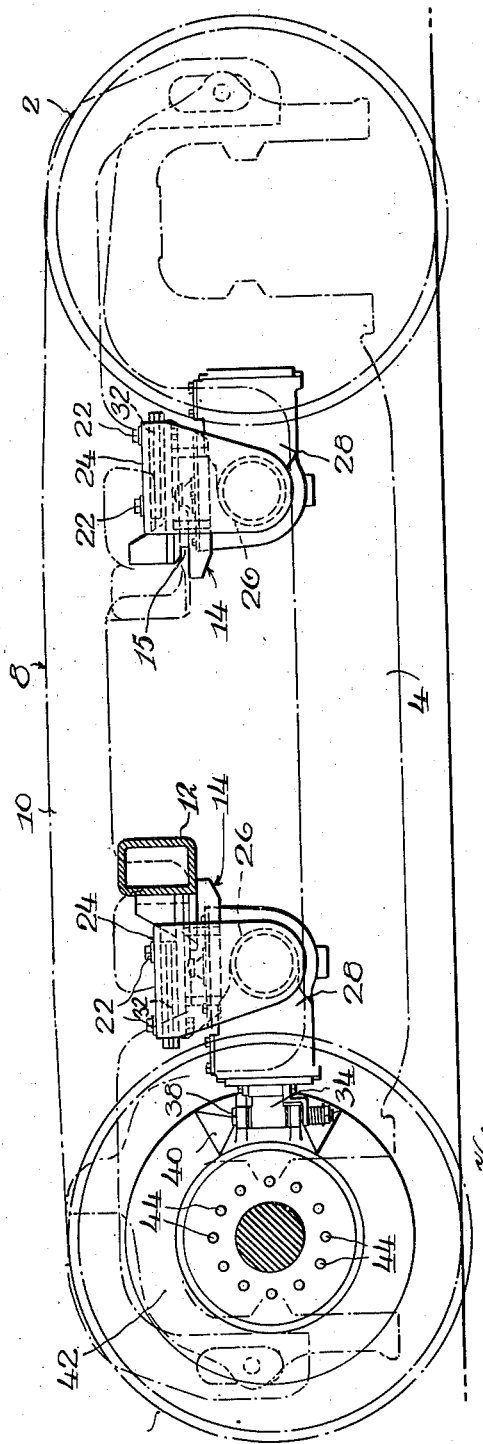
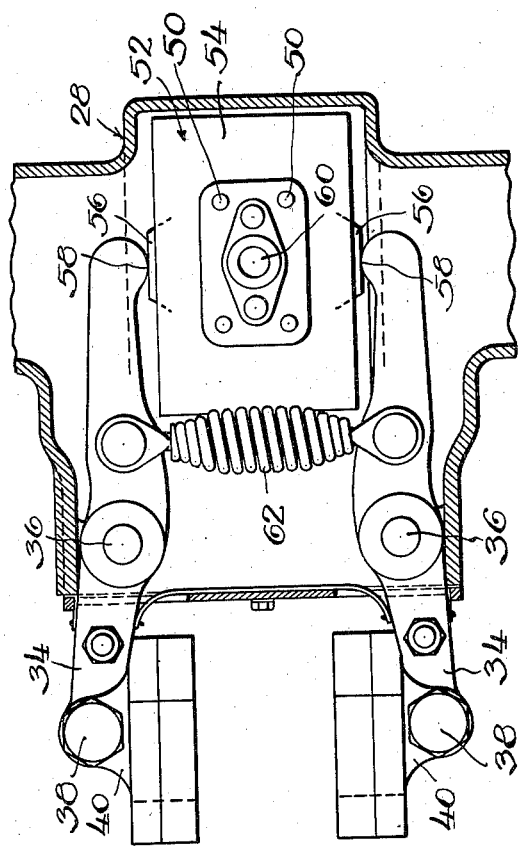
INVENTOR.
Walter H. Baselt
BY
O. B. Garner
Atty.

Sept. 21, 1948.  W. H. BASELT  2,449,636
BRAKE CYLINDER MOUNTING
Filed July 2, 1945  4 Sheets-Sheet 3
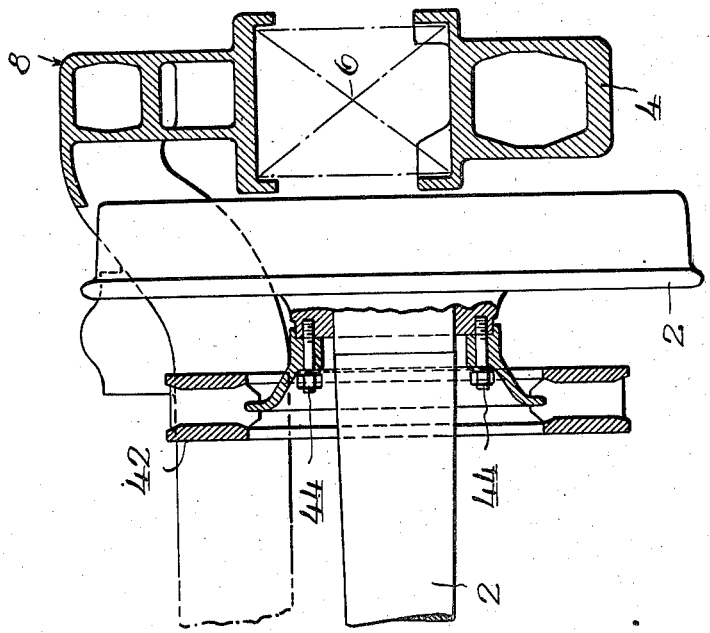
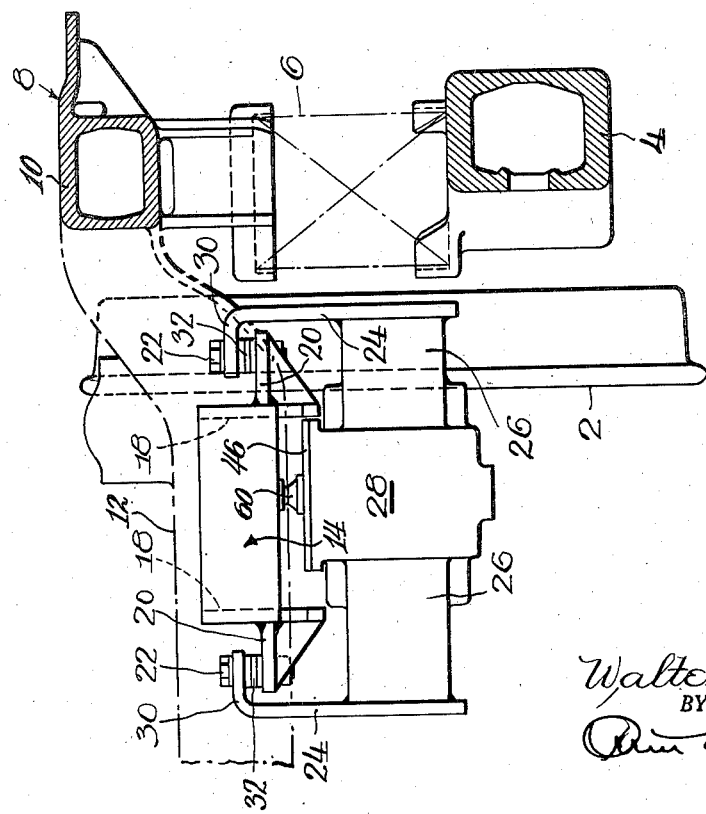
INVENTOR.
Walter H. Baselt
BY
Atty.

Sept. 21, 1948.  W. H. BASELT  2,449,636
BRAKE CYLINDER MOUNTING
Filed July 2, 1945  4 Sheets-Sheet 4

INVENTOR.
Walter H. Baselt
BY

Patented Sept. 21, 1948

2,449,636

UNITED STATES PATENT OFFICE 2,449,636

BRAKE CYLINDER MOUNTING

Walter H. Baselt, Chicago, Ill., assignor to American Steel Foundries, Chicago, Ill., a corporation of New Jersey Application July 2, 1945, Serial No. 602,830

20 Claims. (Cl. 188—153)

This invention relates to railway brake rigging and more particularly to a novel disc or rotor brake arrangement wherein braking means is provided for decelerating a brake disc or rotor attached to the wheel and axle assembly of a railway car truck.

A general object of the invention is to provide a novel suspension for the braking means associated with the brake discs, said suspension being particularly adapted to accommodate assembly and disassembly of the actuating means for the brake apparatus.

Another object of the invention is to design a brake suspension wherein a cylinder housing associated with each disc is afforded a simple readily removable connection to the associated truck frame in such manner as to accommodate assembly and disassembly of a cartridge cylinder unit mounted within the cylinder housing for actuation of brake levers fulcrumed thereto.

A more specific object of the invention is to design a brake support such as above described wherein a yoke associated with each disc is disposed entirely at one side of the longitudinal center line of the truck and is mounted on a transversely extending member of the truck frame. The cylinder housing projects between spaced arms of the yoke and is afforded a novel and readily removable connection thereto, the cartridge cylinder unit being readily removable from the top of the cylinder housing between the spaced arms of the yoke.

In the drawings:

Figure 1 is a half top plan view of a railway car truck embodying the invention, only one side thereof being illustrated inasmuch as the truck is symmetrical about its longitudinal center line;

Figure 2 is a composite view, the right half thereof being a side elevation of the truck shown in Figure 1, and the left half thereof being a sectional view taken in a longitudinal vertical plane bisecting the truck;

Figure 3 is a fragmentary sectional view taken in the transverse vertical plane bisecting the truck as indicated by the lines 3—3 of Figure 1;

Figure 4 is a sectional view taken in the transverse vertical planes indicated by the line 4—4 of Figure 1; and Figure 5 is a fragmentary top view of one of the cylinder housings and the associated brake mechanism, portions of the housing being broken away to more clearly illustrate the mechanism therein.

Figure 6:
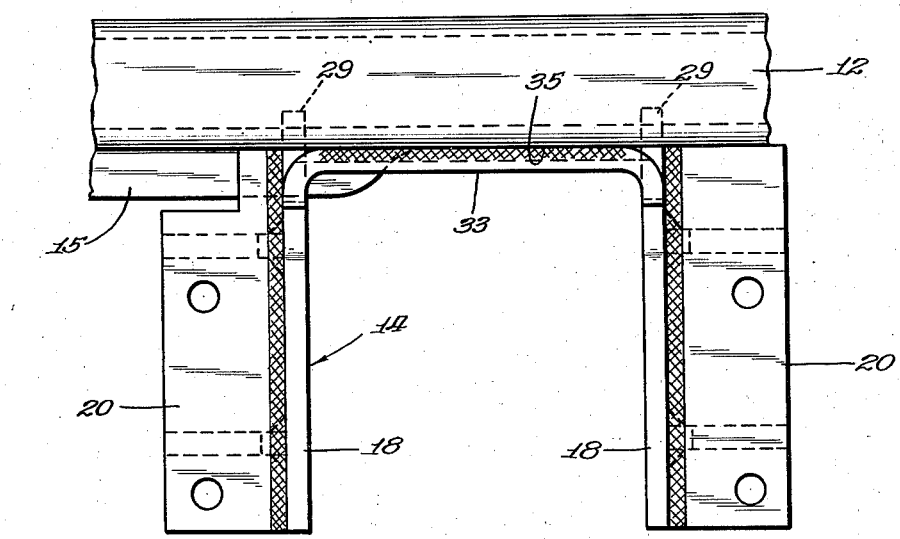
Figure 7:
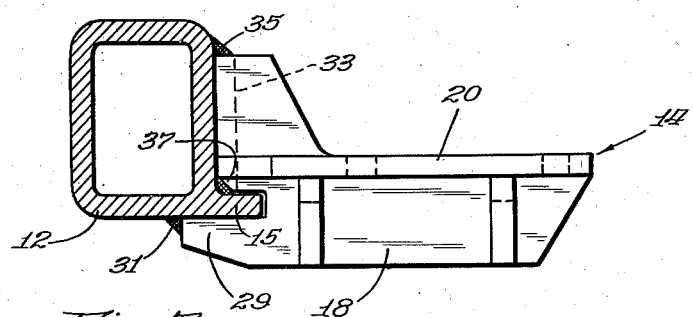
Figure 8:
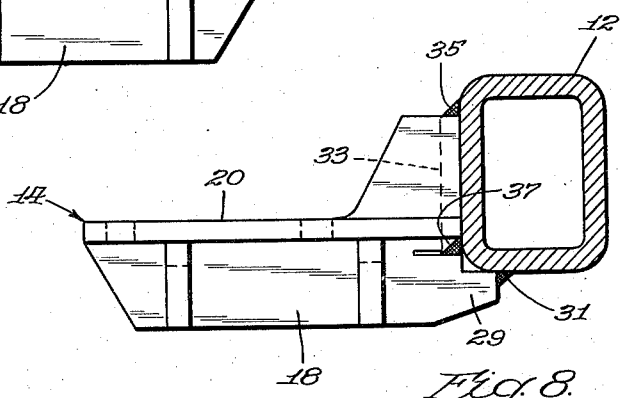
Figure 9:
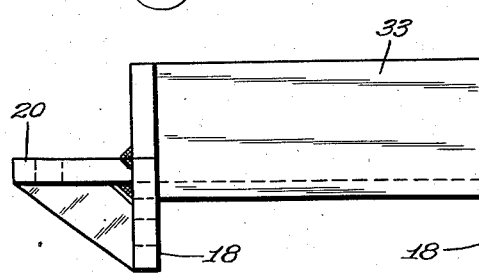

Figures 6 to 9 inclusive, illustrate the brake frame and its connection to the truck frame in detail, Figure 6 being a top plan view of the brake frame and associated truck frame transom, Figure 7 being a side elevation taken from the left of Figure 6, Figure 8 being a side elevation taken from the right of Figure 6, and Figure 9 being a front elevational view of the brake frame with the transom eliminated.

In each of said figures, certain details may be omitted where more clearly seen in other views, in order to clarify the illustration.

Describing the invention in detail, the truck comprises spaced wheel and axle assemblies 2, 2 having conventional journal means (not shown) at the ends thereof affording support in the usual manner for an equalizer member 4 supporting spring means diagrammatically indicated. The spring means 6 afford support in the usual manner for a truck frame generally designated 8 and comprising a side rail 10 at each side thereof connected to spaced transversely extending members or transoms 12, 12 which afford support for a truck bolster (not shown).

A brake support frame or yoke, generally designated 14, is connected to each transom 12 in any convenient manner, as by welding, in tongue and groove engagement with a rib 15 of the transom 12, as best seen in Figures 6 and 7. Each brake support yoke 14 comprises spaced arms 18, 18 with ledges or wing portions 20, 20 on the remote sides thereof affording readily removable connections as at 22, 22 to the upstanding torque arms 24, 24 connected to torque tubes 26, 26 projecting from opposite sides of a cylinder housing 28, each of said torque arms being flanged at its upper end as at 30 to afford convenient connection to the associated ledge 20 as by bolt and nut assemblies at 22, 22. Shim means 32 are positioned between each flange 30 and the associated ledge 20 to accommodate vertical adjustment of the cylinder housing 28.

A pair of brake levers 34, 34 are fulcrumed as at 36, 36 intermediate the ends thereof within the cylinder housing 28, each of said levers being pivotally fulcrumed as at 38 to a brake head 40 carrying friction means for engagement with an associated brake disc or rotor 42, said rotor being connected as at 44, 44 (Figure 2, left) to the hub of the adjacent wheel for rotation with the wheel and axle assembly 2.

A cover plate 46 is removably connected as by bolts 48, 48 to the top of the cylinder housing 28, said cover plate being bolted at 50, 50 to a cartridge cylinder unit 52 disposed within the cylinder housing 28, said unit comprising a cylinder 54 with spaced pistons 56, 56 therein engaged at 58, 58 with the arcuate inner extremities of the brake levers 34, 34, said cylinder comprising a nozzle 60 projecting through a complementary opening in the associated cover plate 46 to afford convenient connection to a source of actuating fluid such as a standard compressed air line. A tension release spring 62 is connected at opposite ends thereof to the levers 34, 34 adjacent their inner extremities for moving said levers to their released position subsequent to a braking operation.

The levers 34, 34 may, if desired, be afforded a pivotal mounting of the type disclosed in my application Serial No. 539,885, filed June 12, 1944, Patent No. 2,436,136, February 17, 1948.

As will be clearly understood from a consideration of Figures 1 and 5, the cartridge cylinder unit 52 may be slidably disengaged from the levers 34, 34 by disconnecting the cover plate 46 from the cylinder housing, then moving the unit 52 slightly toward the rear of the housing to afford clearance from the release spring 62, and then lifting the unit from the cylinder housing between the spaced arms 18, 18 of the yoke 14. By means of this arrangement the cartridge cylinder unit 52 may be readily disassembled to permit cleaning and repair or replacement of the cylinder 54 and the pistons 56, 56, without dismantling the brake levers 34, 34 and their associated support structure. It may be noted that the cartridge cylinder unit 52 is, per se, no part of the present invention, and is therefore not illustrated in detail herein, said unit being fully described and shown in United States Letters Patent No. 2,355,120, issued August 8, 1944, to Carl E. Tack.

One of the brake frames 14 and its connection to the transom 12 are shown in detail in Figures 6 to 9 inclusive, wherein it will be seen that each arm 18 comprises a lug 29 underlying the transom 12 and welded thereto as at 31 (Figures 7 and 8). The frame 14 also comprises a web 33 joining the arms 18 and this web is welded at its upper edge to the transom as at 35 and at the lower edge of the web as at 37. As above noted, the transom rib 15 extends through a complementary slot in one of the arms 18 in tongue and groove engagement therewith, as best seen in Figures 6 and 7.

Thus it will be understood that the novel brake arrangement above described comprehends a structure in which each cylinder housing 28 is entirely supported from a sprung member 8 of the truck, said cylinder housing being conveniently connected to a support structure particularly designed to facilitate assembly and disassembly of the actuating means for the brake levers without dismantling the rest of the brake mechanism. Also, each cylinder housing is afforded a convenient and readily removable connection to a support yoke associated therewith and entirely disposed at one side of the longitudinal center line of the truck, thereby accommodating removal of each cylinder housing and the associated brake mechanism from its support structure without dismantling the corresponding cylinder housing at the opposite side of the truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck comprising a truck frame including a side rail at each side thereof and a transversely extending member connected to said rail at each side of the transverse center line of said frame, and spaced wheel and axle assemblies supporting said frame adjacent respective ends thereof, the combination of brake means for each assembly comprising a yoke supported by the adjacent member and including spaced arms with ledges on the remote sides thereof, a cylinder housing projecting at its upper extremity into said yoke and comprising torque arms removably connected to respective ledges, a pair of brake levers fulcrumed to said housing and carrying brake shoes, a cartridge cylinder unit in said housing comprising a cylinder and spaced pistons therein bearing against respective levers, said unit being slidably disengageable from said housing and removable from the top thereof without dismantling said levers, and a brake rotor connected to said assembly and disposed between said shoes for braking engagement therewith.

2. In a brake arrangement for a railway car truck comprising a truck frame including a side rail at each side thereof and spaced transversely extending members connected to said rail adjacent the center of said frame, and spaced wheel and axle assemblies supporting said frame adjacent respective ends thereof, the combination of a brake apparatus for each assembly comprising a yoke supported by the adjacent member, a cylinder housing projecting at its upper extremity into said yoke and connected thereto, spaced brake levers fulcrumed to said housing and carrying brake shoes, a cartridge cylinder unit in said housing readily removable from the top thereof, said unit comprising spaced pistons engaging respective levers and slidably disengageable therefrom, and a brake disc rotatable with said assembly and disposed between said shoes for braking engagement therewith.

3. In a brake arrangement for a railway car truck comprising a truck frame including a side rail at each side thereof and spaced transverse members interconnecting the side rails adjacent the center of said frame, and spaced wheel and axle assemblies supporting said frame, the combination of a brake surface rotatable with each assembly, a brake yoke supported by the adjacent transverse member, said yoke being entirely disposed at one side of the longitudinal center line of said truck, a cylinder housing projecting into said yoke and removably connected thereto, and brake means carried by said housing for braking engagement with said surface.

4. In a brake arrangement for a railway car truck comprising a truck frame including a side rail at each side thereof and spaced transverse members interconnecting the side rails, and spaced wheel and axle assemblies supporting said frame, the combination of a brake surface rotatable with each assembly, a brake yoke supported by the adjacent transverse member, a cylinder housing projecting into said yoke and having portions extending therebeneath, upstanding torque arms on respective portions removably interconnected at their upper extremities to external portions of said yoke, and friction means carried by said housing for braking engagement with said surface.

5. In a brake arrangement for a railway car truck comprising a truck frame and a supporting wheel and axle assembly, the combination of support structure including spaced arms connected to said frame, a cylinder housing projecting at its upper end between said arms and having portions extending therebeneath, torque means connecting said portions to the remote sides of said arms, brake means carried by said housing for engagement with a brake surface of said assembly, and actuating means within said housing for said brake means, said actuating means comprising a cartridge cylinder unit removable from the top of said housing without dismantling said brake means therefrom.

6. In a brake arrangement for a railway car truck comprising a truck frame including a side rail at each side thereof and spaced transverse members interconnecting the side rails, and spaced wheel and axle assemblies supporting said frame, the combination of brake apparatus for each assembly comprising a brake surface rotatable therewith, a brake yoke supported by the adjacent transverse member, a cylinder housing projecting into said yoke and connected to the remote sides thereof, and brake means carried by said housing for braking engagement with said surface.

7. In a brake arrangement for a vehicle comprising a frame and a supporting wheel and axle assembly, the combination of a brake disc rotatable with said assembly, a yoke carried by said frame, a cylinder housing projecting at its upper end into said yoke and removably connected thereto, brake levers fulcrumed from said housing and carrying friction means for engagement with said disc, and actuating means for said levers comprising a cartridge cylinder unit within said housing and readily removable from the top thereof, said yoke being entirely disposed at one side of the longitudinal center line of said frame.

8. In a brake arrangement for a railway car truck comprising a truck frame and spaced supporting wheel and axle assemblies each including an axle, spaced wheels thereon, and a brake disc adjacent each wheel, the combination of a yoke carried by said frame adjacent each disc, spaced external ledges on said yoke at opposite sides thereof, a cylinder housing projecting into said yoke and having spaced torque arms, readily removable means connecting each arm to the adjacent ledge, and brake means supported by said housing for decelerating the associated disc.

9. In a brake arrangement for a railway car truck comprising a truck frame and spaced supporting wheel and axle assemblies each including an axle, spaced wheel thereon and a brake disc adjacent each wheel, the combination of a yoke carried by said frame adjacent each disc, spaced wing portions on the remote sides of said yoke, a cylinder housing projecting into said yoke, means connecting said housing to each wing portion, and friction means carried by said housing for braking engagement with the associated disc.

10. In a brake arrangement for a railway car truck comprising a truck frame and spaced supporting wheel and axle assemblies each including an axle, spaced wheels thereon and a brake disc adjacent each wheel, the combination of a yoke carried by said frame adjacent each disc, a cylinder housing projecting into said yoke, torque arms on said housing connected to opposite sides of said yoke externally thereof, and friction means carried by aid housing for frictional engagement with opposite sides of the associated disc.

11. In a brake arrangement for a railway car truck comprising a truck frame and spaced supporting wheel and axle assemblies each including an axle, spaced wheels thereon and a brake disc adjacent each wheel, the combination of a yoke carried by said frame adjacent each disc, a cylinder housing projecting into said yoke, readily removable means interconnecting said housing and said yoke, and brake means carried by said housing for decelerating the associated disc, said yoke being entirely disposed at one side of the longitudinal center line of said truck.

12. In a brake arrangement for a vehicle comprising a frame and a supporting wheel and axle assembly, the combination of a brake disc rotatable with said assembly, a yoke carried by said frame, a cylinder housing projecting at its upper end into said yoke and removably connected thereto, brake levers fulcrumed from said housing and carrying friction means for engagement with said disc, and actuating means for said levers comprising a cartridge cylinder unit within said housing and readily removable from the top thereof.

13. In a brake arrangement for a railway car truck comprising a truck frame and a supporting wheel and axle assembly, the combination of support structure including spaced arms connected to said frame, a cylinder housing projecting at its upper end between said arms and having portions extending therebeneath, torque means connecting said portions to the remote sides of said arms, brake means carried by said housing for engagement with a brake surface of said assembly, and actuating means within said housing for said brake means.

14. In a brake arrangement for a railway car truck comprising a truck frame and a supporting wheel and axle assembly, the combination of a yoke entirely carried by the frame, a cylinder housing projecting at its upper end into said yoke and removably connected thereto, brake means carried by said housing for engagement with a brake surface of said assembly, and actuating means within said housing for said brake means, said actuating means comprising a cylinder unit removable from the top of said housing.

15. In a brake arrangement for a railway car truck comprising a truck frame and a supporting wheel and axle assembly, a substantially U-shaped brake support structure carried by said truck and entirely disposed at one side of the longitudinal center line thereof, and brake apparatus comprising a cylinder housing connected to said structure with the top of said housing disposed between the spaced arms of said U, means carried by said housing for decelerating said assembly, and actuating means for said decelerating means comprising a cylinder unit mounted in said housing and removable from the top thereof between said arms.

16. In a brake arrangement for a railway car truck comprising a truck frame and a supporting wheel and axle assembly, the combination of a support structure including spaced arms carried by said frame at one side of the longitudinal center line thereof, a cylinder housing, means removably connecting said housing to said structure with at least a portion of the top surface of said housing in alignment with the space between said arms, a cylinder unit removably mounted in said housing in alignment with said space and removable therethrough, and means carried by said housing for decelerating said assembly and operatively associated with said unit for actuation thereby.

17. In a brake arrangement for a railway car truck comprising a truck frame and a supporting wheel and axle assembly, the combination of a brake support structure including spaced arms carried by said frame at one side of the longitudinal center line thereof; a cylinder housing, means removably connecting said housing to the remote sides of said arms, at least a portion of the top surface of said housing being in alignment with the space between said arms; a cylinder unit removably mounted in the top of said housing in alignment with said space and removable therethrough, and means carried by said housing for decelerating said assembly and operatively associated with said unit for actuation thereby.

18. In a brake arrangement for a railway car truck comprising a truck frame and a supporting wheel and axle assembly, the combination of a brake support structure including spaced arms with ledges on the remote sides thereof, a housing with spaced arms projecting upwardly and comprising portions overlying respective ledges, means securing said arms to said ledges, and means carried by said housing for decelerating rotation of said assembly.

19. In a brake arrangement for a railway car truck comprising a truck frame and a supporting wheel and axle assembly, the combination of a brake support structure including spaced arms with ledges on the remote sides thereof, a housing with spaced arms projecting upwardly and comprising portions overlying respective ledges, means securing said arms to said ledges, means carried by said housing for frictionally engaging a brake surface of said assembly, and actuating means in said housing for the first-mentioned means, said actuating means being detachably connected to said housing at a portion of the top surface thereof in alignment with the space between said arms.

20. In a brake arrangement for a railway car truck comprising a truck frame and a supporting wheel and axle assembly, the combination of a brake support structure including spaced arms carried by said frame, a housing supported by said structure, means carried by said housing for frictionally engaging a brake surface of said assembly, actuating means in said housing for the first-mentioned means, said actuating means being detachably connected to said housing at a portion of the top surface thereof in alignment with the space between said arms.

WALTER H. BASELT.

REFERENCES CITED

The following references are of record in the file of this patent:

UNITED STATES PATENTS

| Number | Name | Date |
|---|---|---|
| 2,343,342 | Tack | Mar. 7, 1944 |
| 2,355,122 | Tack | Aug. 8, 1944 |